(12) United States Patent
Urup

(10) Patent No.: US 11,375,699 B2
(45) Date of Patent: *Jul. 5, 2022

(54) PLANT FOR FISH FARMING AND ITS USE

(71) Applicant: Veolia Water Solutions & Technologies Support, SAS, Saint Maurice (FR)

(72) Inventor: Bent Urup, Fredericia (DK)

(73) Assignee: Veolia Water Solutions & Technologies Support, SAS, Saint-Maurice (FR)

( * ) Notice: Subject to any disclaimer, the term of this patent is extended or adjusted under 35 U.S.C. 154(b) by 224 days.

This patent is subject to a terminal disclaimer.

(21) Appl. No.: 16/402,362

(22) Filed: May 3, 2019

(65) Prior Publication Data

US 2019/0269109 A1   Sep. 5, 2019

Related U.S. Application Data

(63) Continuation of application No. 14/889,842, filed as application No. PCT/DK2014/000022 on May 2, 2014, now Pat. No. 10,285,385.

(30) Foreign Application Priority Data

May 14, 2013 (DK) .............................. PA 201300291
Nov. 8, 2013 (DK) .............................. PA 201300634

(51) Int. Cl.
*A01K 61/10*   (2017.01)
*A01K 63/04*   (2006.01)
(Continued)

(52) U.S. Cl.
CPC ............ *A01K 63/045* (2013.01); *A01K 61/10* (2017.01); *A01K 61/90* (2017.01); *A01K 63/006* (2013.01); *A01K 63/04* (2013.01); *A01K 63/06* (2013.01)

(58) Field of Classification Search
CPC ........ A01K 61/08; A01K 61/10; A01K 63/00; A01K 63/04
(Continued)

(56) References Cited

U.S. PATENT DOCUMENTS 3,116,712 A   1/1964   Ogden et al.
3,166,043 A   1/1965   Castillo
(Continued)

FOREIGN PATENT DOCUMENTS

CN   102293175     12/2011
CN   202172709 U    3/2012
(Continued)

OTHER PUBLICATIONS

Machine Translation of WO 92/12627, 3 pages.
(Continued)

*Primary Examiner* — David J Parsley
(74) *Attorney, Agent, or Firm* — Coats & Bennett, PLLC

(57) ABSTRACT

The present invention is directed to a first farming plant including a central tank and one or more surrounding tanks, where the central tank is used for water treatment and the one or more surrounding tanks are used for the farming of fish. The fish farming plan may also include one or more flow applicators, whereby the flow rate of the water in the surrounding tanks are individually independent of the water exchange rate. The fish farming plant may include several movable permeable section walls in each of the surrounding tanks dividing each surrounding tank into tank sections. Each surrounding tank is equipped with one or more outlets and one or two inlets, and a substantially horizontal/laminar flow structure of the water in each one of the surrounding tanks is provided.

4 Claims, 6 Drawing Sheets

(51) Int. Cl.
*A01K 61/90* (2017.01)
*A01K 63/00* (2017.01)
*A01K 63/06* (2006.01)

(58) Field of Classification Search
USPC .................. 119/215–216, 219, 224–227
See application file for complete search history.

(56) References Cited

U.S. PATENT DOCUMENTS

| | | | |
|---|---|---|---|
| 3,566,839 A | | 3/1971 | Hilble |
| 3,773,014 A | * | 11/1973 | Ewald, Jr. .............. A01K 61/00 119/224 |
| 3,886,902 A | | 6/1975 | Haynes |
| 3,888,210 A | | 6/1975 | Buss |
| 4,003,337 A | | 1/1977 | Moore |
| 4,221,187 A | | 7/1980 | Casey |
| 4,228,762 A | * | 10/1980 | Kemp .................. A01K 61/59 119/207 |
| 5,081,954 A | | 1/1992 | Monus |
| 5,253,610 A | * | 10/1993 | Sharber ................ A01K 79/02 119/200 |
| 5,353,745 A | | 10/1994 | Fahs, II |
| 6,117,313 A | | 9/2000 | Goldman et al. |
| 6,171,480 B1 | | 1/2001 | Lee et al. |
| 6,192,833 B1 | | 2/2001 | Brune et al. |
| 6,932,025 B2 | | 8/2005 | Massingill et al. |
| 7,052,601 B2 | | 5/2006 | Gravdal |
| 7,381,326 B2 | | 6/2008 | Haddas |
| 8,371,245 B2 | * | 2/2013 | Papadoyianis ......... A01K 61/60 119/223 |
| 2004/0256301 A1 | | 12/2004 | Gravdal |
| 2005/0120970 A1 | | 6/2005 | Massingill et al. |
| 2009/0229532 A1 | | 9/2009 | Herbert et al. |

FOREIGN PATENT DOCUMENTS

| | | |
|---|---|---|
| DE | 2829496 | 1/1980 |
| DE | 8605102 | 7/1986 |
| DE | 202007007815 | 10/2007 |
| EP | 1763995 | 3/2007 |
| GB | 2016882 | 10/1979 |
| GB | 2168231 A | 6/1986 |
| JP | 4-71455 | 6/1992 |
| KR | 101158249 | 7/2012 |
| WO | 92/12627 | 8/1992 |
| WO | 2018033189 A1 | 2/2018 |

OTHER PUBLICATIONS

Machine Translation of EP 1763995, 13 pages.
"Sorting and Grading Warmwater Fish" by Gary L. Jensen, SRAC Publication No. 391, Jun. 1990, 8 pages.
"Trout and Salmon Culture (Hatchery Methods)" by Earl Leitritz et al., OAC Fish Bulletin 164, 1976, 4 pages.
Machine Translation of DE 2829496, 21 pages.
Presentation by Dr. Bent Urup, Transcript from Global Forum for Innovation and Agriculture, Feb. 3-4, 2014, 59 pages.
"Fish for the Future: Concepts and Methods of Intensive Aquaculture" by George W. Klontz, Text No. 5, Feb. 1991, 219 pages.
"The Aquarium of the United States Fish Commission at the World's Columbian Exposition" by S.A. Forbes, pp. 143-158.
"Review of circular tank technology and management" by Michael B. Timmons et al., Aquacultural Engineering 18 (1998), pp. 51-69.
English Translation of JP 4-71455, 4 pages.
English translation of CN 102293175A, 45 pages.
Third Office Action issued by Chinese Patent office dated Mar. 2, 2018 and English translation, 17 pages.
Connolly, K., et al., "Optimization of a Backyard Aquaponic Food Production System", BREE 495 Design 3, Bioresource Engineering, Faculty of Agricultural and Environmental Sciences, Macdonald Campus, McGill University, Apr. 14, 2010, pp. 1-74.
Niri, "A Flexible, cost-effective and environmentally friendly production concept that generates superior returns", retrieved from the internet: URL: http://niri.com/fish-farming/production-concept/ [retrieved on Apr. 6, 2014], Jan. 1, 2012, pp. 1-8.
Aqua Partners, "Recirculation Technology Hatchery & RAS design", retrieved from the internet: URL: http://www.aqua-partners.dk/ras2020/commercial-advantages [retreived on Nov. 5, 2019], Apr. 22, 2017, pp. 1-4.

* cited by examiner

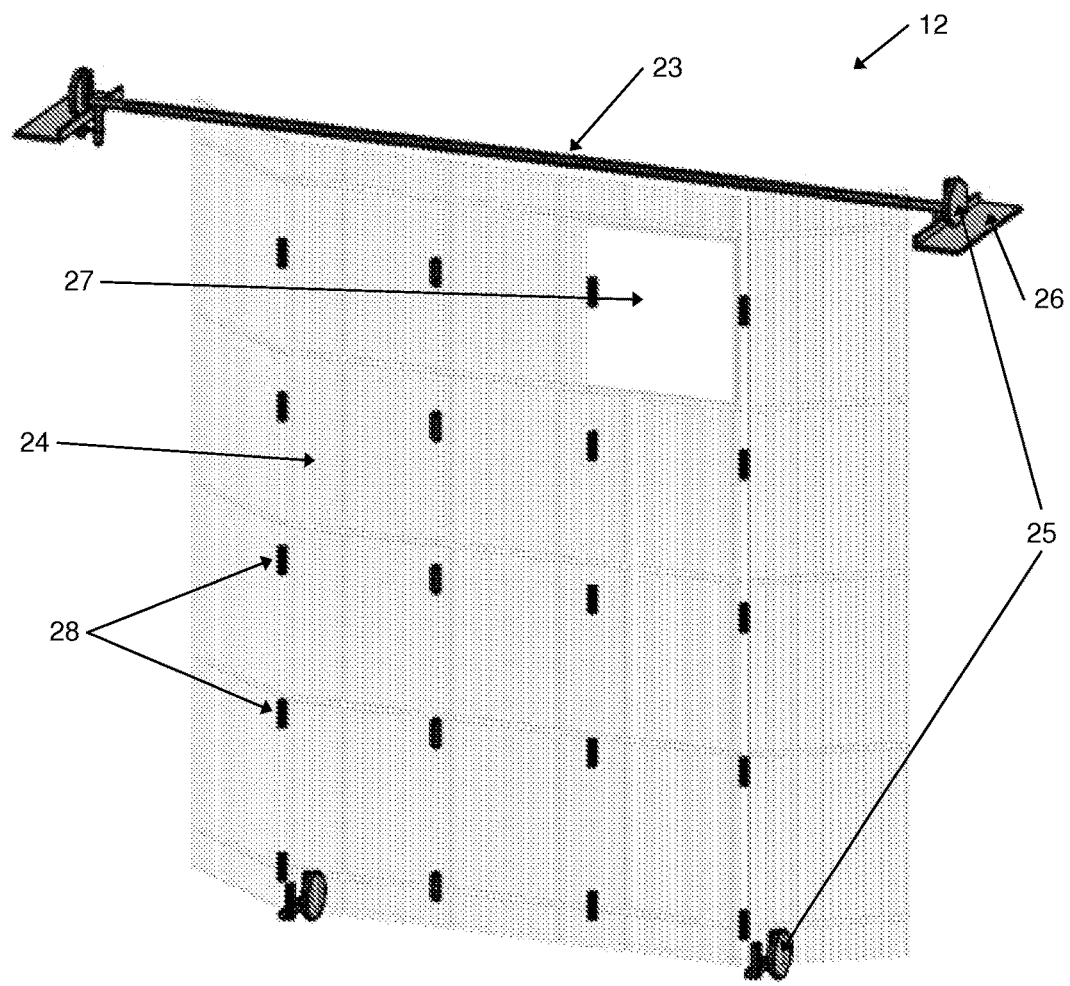
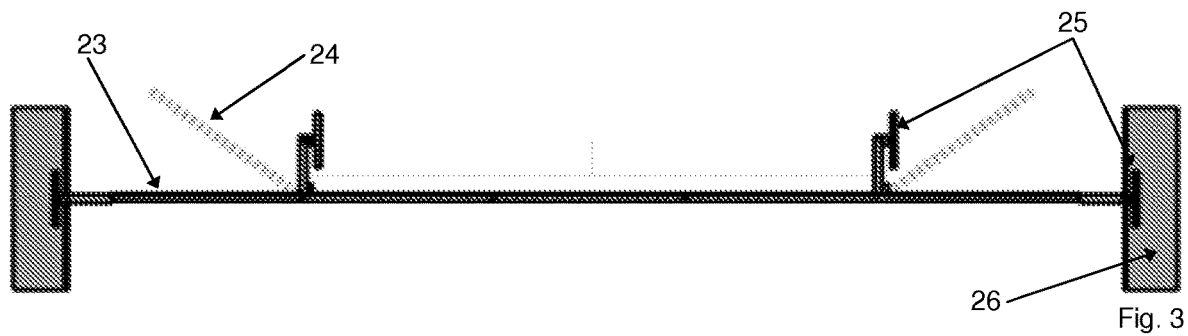
Fig. 2
Fig. 3

PLANT FOR FISH FARMING AND ITS USE

The present application is a continuation of U.S. patent application Ser. No. 14/889,842 filed May 2, 2014, which is a U.S. National Stage Application of PCT Application No. PCT/DK2014/000022, filed May 2, 2014. Applicant claims priority based on Danish Patent Application No. PA 2013 00291, filed May 14, 2013, and Danish Patent Application No. PA 2013 00634, filed Nov. 8, 2013. The subject matter of these applications is expressly incorporated herein by reference.

The invention relates to a fish farming plant comprising a central tank and one or more surrounding tanks, preferably circular and with the same center, where the central tank is used for water treatment, including biofiltration with a biofilter, and where the one or more surrounding tanks are used for fish farming of preferably kingfish, salmon fish, grouper fish, barramundi and mahi mahi, and that the fish farming plant further is equipped with flow applicators, whereby the flow rate of the water in the surrounding tanks is independent of the water exchange rate.

The invention furthermore comprises the use of the fish farming plant for production of edible fish including the following pelagic species: kingfish, salmon fish, grouper, barramundi and mahi mahi.

Where weather screen, fish tanks and water treatment plants in previous RAS concepts are isolated structures, they constitute an integrated structure in the new concept. Furthermore, the concept includes a new fish tank concept, which also can find use outside RAS, where a tank is divided into several tank sections, with movable permeable traverse walls that separates the individual tank sections. This makes continuous adjustments of the size of the individual tank sections possible, which means that the fish concentration can be kept optimal during the entire growth.

The invention is not limited to any specific water treatment technology, as all known existing technologies can be integrated/installed in the concept. On the contrary, the new tank and integrated building concept are the central in the invention.

The new plant concept will through reduced investment, reduced building time and the opportunity for implementation of new operational routines result in a better profitability in RAS-plants constructed according to the new concept, compared to plants constructed according to existing concepts.

Where RAS-technology to date primarily has been used for production of fry, where the fry quality and the supply reliability have been more important than the plant investment, the new concept, which primarily is directed to the production of slaughter fish, provides new possibilities for distribution of RAS-technology, and sale of water treatment technology for fish farming. As RAS-plants pollute very little compared to open plants, an increased use of RAS-plants for fish farming will have an impact on the environment.

The invention relates to the kind of plants for fish farming the uses the term RAS-plants.

RAS stands for Recirculated Aquaculture Systems, and is the generally used term in the aquaculture industry for closed fish farming plants, where a fish production plant with land based tanks is connected with a water treatment plant that cleans the water, so that a very high degree of recirculation can be achieved. Generally there is used less than 1 $m^3$ new water per kg food in a RAS-plant, and in most plants much less, down to about 50 liter new water per kg food. More than 99% of the flow going to the fishes is typically recycled after the cleaning process.

By comparison a flow-through plant uses in the order of 50 $m^3$ per kg food.

After discharge from the fish vessels in the cleaning plant, the water in a RAS-plant undergoes a cleaning process that normally includes removal of particular material, dissolved organic material, conversion of ammonium to nitrate, stripping of $CO_2$ and some form of antibacterial treatment of the water, often in form of UV-radiation.

RAS-technology has a number of advantages, among other things that the water quality, and not least, the temperature can be completely controlled the entire year, which again means that one among other things can breed fish at much higher densities and higher growth rate than in traditional pond farming, where low temperatures in the winter time leads to reduced or no growth.

As the temperature control is crucial for the economy in the plants, the plants are generally constructed indoors; except eventually in the tropics where the temperature is fairly constant the entire year.

Temperature control and a high fish density are crucial for the economy in a RAS-plant.

The cold-blooded fish grow much faster when temperature control is used, and the production time can under certain circumstances be cut in half compared to outdoor plants.

The high fish density means that the plants can be reduced in size, and thereby can the building price for the plants be reduced substantially.

There are different water treatment technologies for RAS-plants.

As RAS-plants normally depends on an indoor installation, combined with an expensive cleaning plant, RAS-plants are relative expensive to install compared to other plants, and the technology has therefore so far primarily been used for production of young fish, where the supply safety and quality is more important than the production price.

The produced young fish of e.g. salmon, is normally put out in open cages at sea where they grow to slaughter size.

There is however a high interest in also being able to produce, e.g. salmon, to slaughter size on land, but today's plants are so expensive to install that it so far only has been competitive with substantial subsidies to the plant investment.

With the known technology a RAS-plant is constructed with a structure as in a traditionally land-based fish farming plant, where the fish are bread in a number of vessel/tank units. In a traditional plant water is lead to the vessel/tank units from lake, sea or river, possible by means of pumps, and the water is after use lead from the tanks out in a recipient.

In a RAS-plant the water is instead lead from the tanks via pipes or channels to a water treatment plant, where the water is treated for waste products and, to an extent, in most cases moreover goes through some kind of bacterial treatment, after which the water is lead back to the fish vessels.

A RAS-plant constructed according to the know concepts consists thus of three main components. a) a number of vessel/tank units that are connected with pipes to, b) a water treatment plant, c) and a weather screen, surrounding the vessel/tank units and the water treatment plant, often in the form of an isolated building, typically constructed as standard industrial/farming building using steal rafters. Nowadays there will typically be three main suppliers involved in the construction of a RAS-plant, a supplier of the water treatment technology, a tank supplier and a building supplier. It is furthermore characteristic of existing RAS-concepts that the piping is rather extensive, as a lot of the piping between fish vessels and water treatment is installed beneath the bottom level in the fish vessels.

Model Pond Farming

The so-called model pond farms constitute something between RAS-plants and open traditional land-based fish farming.

These plants is constructed outdoors, and treatment of the water is not so intensive as in RAS-plants, which means that recirculation of water is significantly lower and there is no temperature control. The model pond farm plants are moreover at lot more bulky than RAS-plants.

In RAS-plants there are used the same kinds of vessels that generally have been used for fish farming. These vessels can be divided in three types.

1) Round tanks with inlet in the periphery and outlet in the center.

This vessel type is characterized in that it has a good self-cleaning effect, and it is easy to create good flow conditions for the fish, provided that it is a fish type that can endure a certain flow speed. The round tank is particular optimal for salmon fish that grow and thrive optimal at a high water speed.

It is a simple and strong construction, and is in RAS-plants the most used type of tanks. The main disadvantage is that this construction type is bulky, as there is a lot of space being wasted between the tanks. This does not mean a great deal in traditional outdoor plants, but it is a problem when the plants are to be established under roof at a high square meter price.

In order to optimize the space one has, especially in RAS-plants, often modified the round tank to an octagon tank, but basically with the same function and the same properties as the round tank. The tank is either serviced from the side (requires additional space) or via a top mounted crossing.

Only one group of fish can be present in each tank.

2) D-ended raceways, is a elongated round vessel, which consists of two half circles, where the outer wall of the two half circles are connected to each other with two parallel upright tank walls, likewise is the center for each of the two half circles connected to each other. The water is normally brought into the periphery, with outlet at both ends of the center wall. Hereby a circular flow is established similar with the round tank.

The advantage of a D-ended raceway is that it utilizes the space better, but it is not self-cleaning to the same extent, and the construction of the tank is relative expensive, since it is not possible to utilize the strength of the circle in the same way as it is for the round tank, and at the same time the water pressure results in a substantial moment on the long sides of the tank. In practice it has often turned out to be difficult to make this kind of tank to function optimally.

The tank is either serviced from the side (demands space) or via a top mounted crossing.

Normally only one group of fish is present in each tank, but theoretically the tank could be divided into several sections.

3) Raceway/longitudinal flow vessel/channel tanks have been used for several hundreds of years. This tank type is also used, though not often, in RAS-plants. The tank type utilized the space better, but the flow and the self-cleaning properties are not optimal.

The tank type constitutes a rectangular box with two parallel upright long sides, and two parallel end sections.

The bottom is normally the same in the entire tank, but the bottom level can if desired fall towards the outlet end of the tank.

A longitudinal flow vessel has water inlet in one end, and outlet in the other, thereby the flow differentiates itself somewhat from the flow in the two above-mentioned vessel types.

In the round tank and in the D-end tank a mixing of the new water and the water already present in the tank occurs, so that the water quality is almost uniform in the entire tank.

In a longitudinal flow vessel cleaned water is lead in at one end and the dirty water out at the other end, so that there is a gradient in the tank, where the water becomes more impure the closer it gets to the outlet end.

The water speed will be low in a raceway, where the water in principle just runs from one end to the other, contrary to round vessels or a D-ended tank, where the water will circulate round in the tank many times before it runs out of the vessel again. The low water speed and lack of centrifugal force means that a longitudinal flow vessel can be difficult to keep clean.

A longitudinal flow vessel has the advantage, although rarely used, that it can be divided into sections, so that several groups of fish can be present in the same tank.

In traditional plants longitudinal flow vessels are normally serviced from the longitudinal side, whereas crossings normally are installed over the tanks in RAS-plants, in order to reduce the building area.

In the model pond farming the tanks are serviced from the side as in traditional pond farms.

Where there in RAS-plants in most cases is used round tanks, then there are most often used tanks of the longitudinal flow type in plants constructed after the model pond farming concept. In the model pond farms the water is lead from water treatment plants through an inlet arrangement to a set-up of several parallel longitudinal vessels. At the outlet end of these longitudinal vessels the outlet water is collected in a channel system in order to be lead back to the water treatment plant.

In pond farming alternatively two large parallel longitudinal flow vessels is used, which are connected at one end, so that they have outlet and inlet at opposite ends, and the outlet from one longitudinal flow vessel lead directly over and functions as inlet to the next longitudinal flow vessel, the tanks are in this way connected in series.

The outlet from the last longitudinal flow vessel lead then directly 100% over in a water treatment system. After the treatment the water is again lead to the first longitudinal flow vessel. The flow in the tank is in this way limited by the water amount that is lead into the tank from the water treatment system.

Several connected longitudinal flow vessels, corresponds to only one long longitudinal flow vessel that are bend double at the center, and where there is installed a water treatment plant between inlet and outlet.

In model pond farming with huge longitudinal flow vessels, these will normally be divided into several sections, so that several groups of fish can be kept.

However, it has turned out that there are some disadvantages with the known prior art, reviewed shortly hereunder.

Space requirements. There are two conditions that especially mean that the plants require a lot of space. One is that there is a huge waste of space around the tanks, especially with the round vessels, which by far is the preferred vessel type in RAS-plants, since it is possible with these vessels to maintain a good water quality, even at the high fish densities that are provided in RAS-plants.

The other condition that causes the plants to take up much space is that the average fish density in the individual vessels are substantially below the fish density that one can operate with. This is due to the fact that when fish are moved to a new vessel, then plans are made such that the fish for example can double their weight, before the vessel is again emptied of fish. From the fish are placed in the vessel until the vessel again is emptied one does not have the option of changing the vessel volume. The fish density in the vessel will therefore, most of the time, be below what is economically optimal, and in practice the necessary tank volume is therefore much higher than what is required theoretically if one consistently could operate at optimal fish density.

Extensive piping. The construction of a RAS-plant, after the known concepts, include a very extensive piping, which takes time and constitute a substantially part of the investment funds.

Vessel types. When choosing fish vessels in existing RAS-plants one has had a choice between a) round vessels that take up much space and that are expensive in piping, but that are well suited for breeding fish at high density, or choice of b) longitudinal flow vessels that uses the area better, and where less piping is required, but that costs more to construct, and where it for several fish species is not possible to create the optimal water speed, hereunder salmon. When using longitudinal flow vessels it is likewise difficult or inappropriately expensive to ensure a water quality that meets the demands for fish breeding.

Building time. It takes a long time to construct a RAS-plant after the present concepts, typically 9-12 months; which, especially, is due to the comprehensive piping beneath the bottom level of the tanks.

From DE2829496 is known a plant for breeding water animals, that reduces the investment funds, by having an outer circular tank with several circular tanks one within the other, where only the outermost wall can handle a one-sided water pressure, which is the reason why all vessels are connected near the bottom level to accommodate one-sided water pressure. Outermost annular tank is for breeding of water animals and divided in preferably 3 smaller sections that all are individually connected to water treatment through the tank bottom. The outer supporting wall, and the uniform water pressure in the plant, means that the walls between the central tank and the surrounding tanks can be constructed thinner than in previous known design, since the walls become exposed to uniform water pressure from both sides. At the same time the necessary building area is reduced by having water treatment in the innermost rings. In the outermost annular tank it is possible to move the division between the three sections, although limited by the fixed installed outlets through the bottom of the tank.

However, it has turned out that there are some disadvantages with this technique, first of all the concept results in an inappropriate flow structure that mainly is vertical, where the fish that primarily are desired to be breed with the present invention, depend on a horizontal/laminar flow structure. Moreover, the connection between each annular tank results in that the entire plant must be shut down, including the water treatment, if a single tank are to be emptied. The plant uses moreover comprehensive pipe installations beneath the level of the tanks, as known from previous designs; the tank concept is basically constructed conventionally, where each individual tank section basically is an isolated tank with its own inlet—an outlet, but having a shape that prevents the establishment of a horizontal flow structure suitable for breeding of certain species, including kingfish and salmon fish.

It is therefore a purpose of the invention to provide a plant suitable for fish breeding, of the RAS type, which has a number of advantages over the current technology.

The object of the invention is obtained by a fish farming plant of the kind described in the preamble of claim 1 wherein the fish farming plant comprises several movable permeable section walls in each of the surrounding tanks, wherein each surrounding tank becomes divided in several tank sections and wherein each surrounding tank is equipped with one or two outlets and one or two inlets irrespective of the number of tank sections, and a wherein a substantially horizontal/laminar flow structure of the water is provided at said fish farming plants.

In this way it accordingly becomes possible to optimize the fish density in the tanks, achieve faster growth, avoid stress of the fish at moving and harvesting and minimize capital investment and construction time. The section walls can in principle be moved steplessly, where the separation between two adjacent tank segments remains intact during the moving. Neither inlet nor outlet requires breakthrough of the bottom of the tank.

In a preferred embodiment the movable permeable section walls are made with an upper rod that is automatically adjustable in the width of the tank, a permeable face that also is automatically adjustable in the width of the tank and that leads from the upper edge of the frame/the rod down to the bottom of the tank, and lower and upper wheels placed at the bottom of the permeable face and in the ends of the rod, respectively.

In a preferred embodiment the permeable face is adjustable in the width of the tank and in that a section in each side is attached to the rest of the moveable permeable section walls with hinges, which are equipped with flexible mechanisms.

In a preferred embodiment the rod is adjustable in the width of the tank, preferably by comprising a double telescopic rod.

In a preferred embodiment the permeable face is equipped with dampers.

In a preferred embodiment the walls between the central tank and the surrounding tanks are equipped with rails above the water column, wherein the upper wheels on the movable permeable section walls can be placed. The rails are moreover equipped with mechanisms for attachment of the movable permeable section walls.

In this way it becomes possible to adjust the size of the tank sections, by simply moving the section walls, whereby the fish density can be optimal under the entire growth, which will significantly increase the outcome per area per time. Since the section walls are adjustable in width it means that they can be moved in a plant constructed of elements, without openings appearing between traverse wall and tank wall.

In a preferred embodiment the fish farming plant is made with a pipe connection to a purge tank, whereto harvest ready fish can be brought, and the pipe connection is adapted so that the hydraulic pressure is constant in the entire connection, and is adapted to not deviate from the pressure in the fish farming tank and in the purge tank at the inlet and outlet of the pipe connection.

Hereby is obtained that the constructions does not cause inconvenience for the transported fish and/or the part of the fish in the tank that is not desired to be harvested. Herewith a smaller part of the fish can be removed from a tank section without preceding starvation. The harvesting is carried out by light exposure of the harvest ready fish and/or by reducing the volume of the tank section in question with the removable permeable section walls.

The fish being harvested or the part of the fish in the tank section that is not being harvested are accordingly not exposed to stress. The harvesting can take place by allowing the fish itself to swim into the purge tank, stimulated by reducing the volume of the tank section in question with the movable permeable section walls and/or by the fish being drawn by the reduced light quantity in the purge tank.

In a preferred embodiment the purge tank is equipped with a number of traverse walls, each equipped with a damper, and a draining means connected to the water treatment system.

In this way it becomes possible to bring fish over to a purge tank without inconvenience for fish not-ready for harvesting, where they can remain until they are ready for harvesting. This means that feeding days are not lost prior to harvest time and thereby is potential growth not lost. That the purge tank is equipped with traverse wall means that it is possible to harvest fish every day, in smaller turns, which can be favorable in certain situations.

As stated in claim 9, that the fish farming plant has one or more radially through-going tank sections without fish farming, for placement of flow applicators and piping of pipes for outlet, inlet and water treatment.

In this way it becomes possible to construct the fish farming plant without the comprehensive pipe installations beneath the bottom level of the tanks, known from earlier RAS-design. This will reduce both the capital investment and time substantially.

In a preferred embodiment a bio-medium is separated at outlet from the biofiltered water by mechanical filtration, which biofilter comprises band filter or corresponding rotating filter, where the medium or parts thereof is lead back to the biofilter after washing.

In a preferred embodiment the fish farming plant comprises a crossing from the outermost surrounding tank to a centrally placed working platform suitable for fish handling. The biofilter is placed beneath the working platform.

In a preferred embodiment the fish farming plant comprises outlets in the entire width of the tank/tanks, which outlets are equipped with valves for adjustment of the outlet rate across the width of the tank. The outlet goes from the bottom of the tank to a height beneath the water level.

In a preferred embodiment the fish farming plant is constructed in linear elements, which can result in a cheap and quick construction of approximately circular structures.

In a preferred embodiment the fish farming plant is constructed entirely or partly of solid materials that do not require that all tanks are filled/emptied simultaneously.

In a preferred embodiment the outer wall of the outer circular tank has raised walls, and comprises an upper climate screen that rests thereon.

In a preferred embodiment the fish farming plant is constructed without piping beneath the bottom level, whereby the fish farming plant can be constructed in only 2 levels.

In a preferred embodiment the fish farming plant is constructed with the entire or parts of the piping beneath the bottom level.

As mentioned the invention also relates to the use of the fish farming plant for production of fish, especially fish with great need for high flow speed, hereunder kingfish, salmon fish and mahi mahi, furthermore grouper, barramundi.

The invention will now be explained with reference to the drawings, in which:

FIG. 1 shows a possible layout for the fish farming plant. Here consisting of the central tank and two surrounding circular tanks, which each is divided in several tank sections by permeable traverse walls, of which most are movable. Only the traverse walls around the tank section with inlet and outlet and flow applicators are fixed. Above the central tank is there a working platform from where the tanks can be serviced. There are moreover placed water treatment elements and purge tank outside the circular structure.

FIG. 2 shows a movable permeable traverse wall, where the upper wheels are placed in rails. The traverse wall is here equipped with a damper through which the fishes can be moved from one tank section to another. This can be done by moving two traverse walls closer together, causing the fish density to become higher and the fishes are thereby forced over in the adjacent tank section.

FIG. 3 shows, seen from above, a movable permeable traverse wall.

FIG. 4 shows a section of the fish farming plant, where the tank section with inlet and outlet and flow applicators is visible. The pipe connection between fish tank and purge tank can be seen close to the outlet. In the purge tank the traverse walls are seen, which separates different harvesting days, where the last section is connected to a draining means.

FIG. 6 shows the same section as FIG. 5, from another angle, whereas

The invention provides a new RAS-concept, a fish farming plant 1, primarily for production of fish from the size of fry fish (3-120 gram) to production of slaughter fish (250-7000 gram), but can also be used for production of so-called smolt (fry fish for production of salmon fish), and other fry production.

A plant constructed after the developed concept, is in general constructed by establishing several cylindrical (or polygonical, if the plant is constructed in elements) containers one within the other, centered around a common center, but with different diameters, where the distance between the walls typically will be 3-10 meter. In this way the overall structure of the plant utilizes the strength of the circle in the structure, and the plant can simplified be seen as a central circular tank 3, surrounded by one or more circular-shaped tanks 2.

Figure 1:
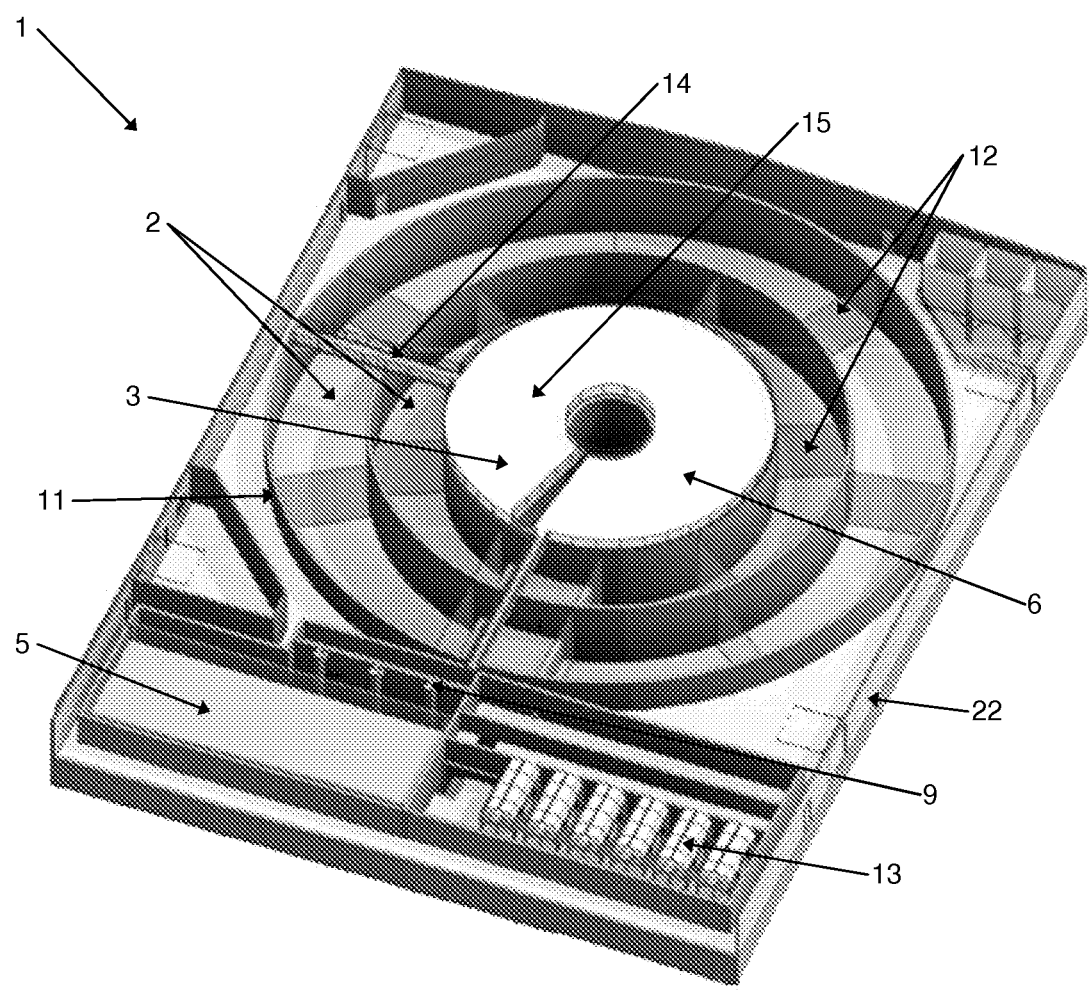

With reference to FIG. 1 the following is stated:

After the water has been through the circular fish tanks 2 it is brought to particle filtration 13, as a first step in the water treatment. Hereafter it is brought to the central tank 3, where biofiltration 6 (primarily conversion of $NH_3/NH_4$ to $NO_3$) takes place. Before the water is brought further on from the biofiltration 6, the bio-medium is separated from the water with band filters 7 or another mechanical separation. After the water has been through biofiltration 6 it is brought to the last step in the water treatment, $CO_2$-stripping 5.

Finally the water is brought back to the circular fish tanks 2. The main pumps 9 in the system can advantageously be installed right below inlet 29 to the fish tanks 2, outside the circular structure.

The exchange rate of the water is to low for a significant flow rate can be obtained just by the water treatment process, which means that flow applicators 8 are necessary to obtain the high flow rate that is optimal for certain fish species, hereunder kingfish, salmon fish, grouper, barramundi and mahi mahi. Flow applicators 8 are thus placed above inlet and outlet 29, 30 that can raise the flow rate to the desired level. Moreover, the flow applicators contribute to optimizing the overall horizontal/laminar flow structure that is build into and functions as a central part of the concept. Flow applicators 8 and the four pipe connections to water treatment (inlet and outlet 29, 30 to the fish tanks and inlet and outlet to biofiltration 6) are placed together, in a screened section of the circular tanks 2, so that they do not disturb the fish.

Above the central tank 3 a working platform 15 is installed, which can be used for fish sorting and handling 16, furthermore the circular tanks 2 can be serviced from the working platform 15.

With reference to FIGS. 2 and 3 is stated the following:

Each of the circular tanks 2 is equipped with several movable permeable traverse walls 12. These are unique in function and are one of the most important differences from earlier RAS-plants. The walls are characterized in that they are steplessly movable, are adjustable in their width, and that the separation between the two adjacent tank segments remains intact during the moving. A traverse wall 12 can consist of an upper rod 23, whereupon the traverse wall 12 itself is attached. This consists of a permeable face 24, where a section in each side of the permeable face 24 is attached to the rest of the traverse wall 12 with an flexible mechanism, e.g. hinges 28. In the bottom of the traverse wall 12, and in the ends of the upper rod are attached wheels 25. The wheels 25 in the bottom of the permeable face 24 are installed so that they rest on the bottom level of the tank. The wheels 25 in the end of the rod 23 are installed so that they rest on rails 26, which are installed on top of the walls between the fish tanks. The rails/walls are moreover equipped with opportunities for attachment of the traverse walls. Alternatively the rod 23 is equipped with a squeezing mechanism that can squeeze on the sides of the rails, and/or the tank wall. In that way it becomes possible to adjust the size of the individual tank sections, so the fish concentration in each tank section always is optimal.

The upper rod 23 can advantageously be a double telescopic rod. This combined with the sections that are attached to the permeable face 24 with hinges 28, ensures that the traverse walls 12 automatically will adjust in the width, and thereby always fit tightly against the circular walls of the fish tanks, even if the plant is constructed of elements, in which case the width of the fish tanks can vary significantly. It thus becomes possible to vary the size of the individual tank sections while they are in operation, without risking that fish from one section finds way to another.

The permeable face 24 can moreover be made with a damper 27, so that the fishes can be lead from one tank section to another, without they must be pumped up or that the traverse wall 12 must be taken out. This will eliminate the stress that the fishes normally are exposed to in connection with moving.

Figure 4:
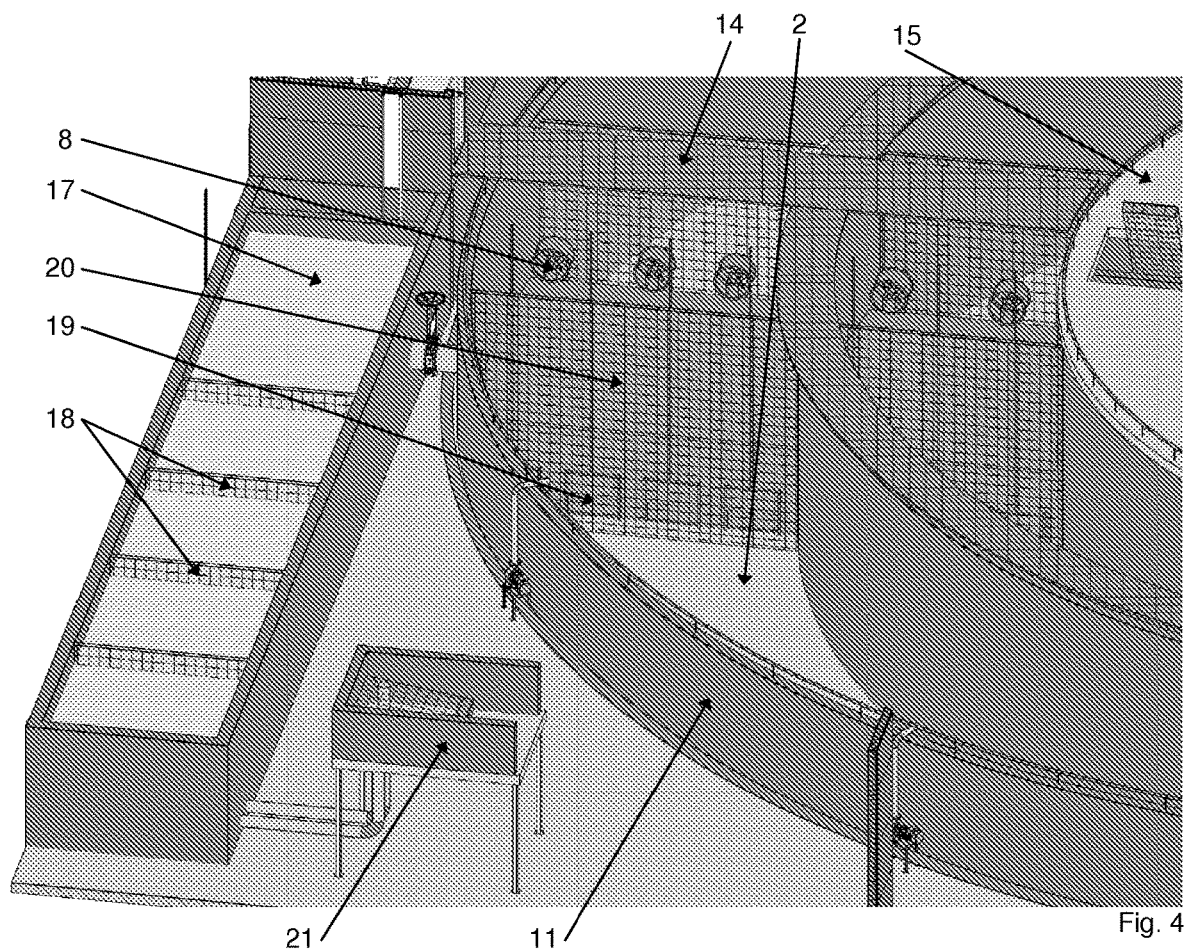
Figure 5:
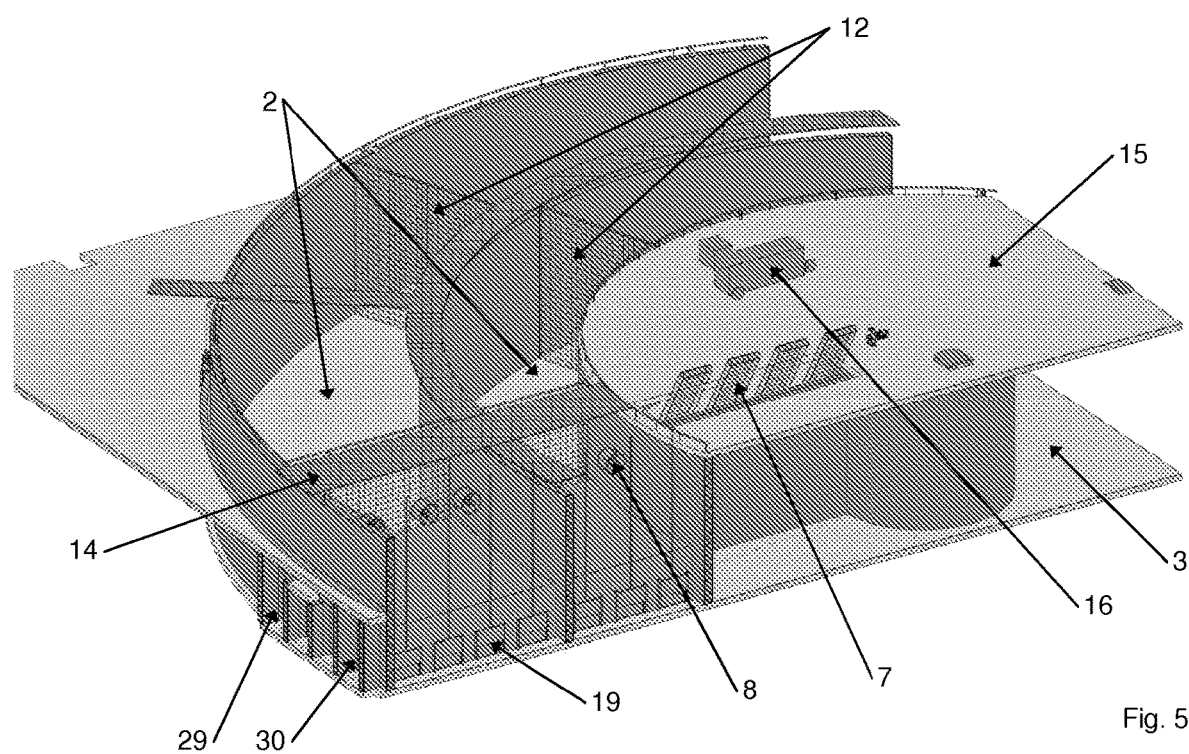
FIG. 5 shows another section of the fish farming plant, where more of the working platform is visible.
Figure 6:
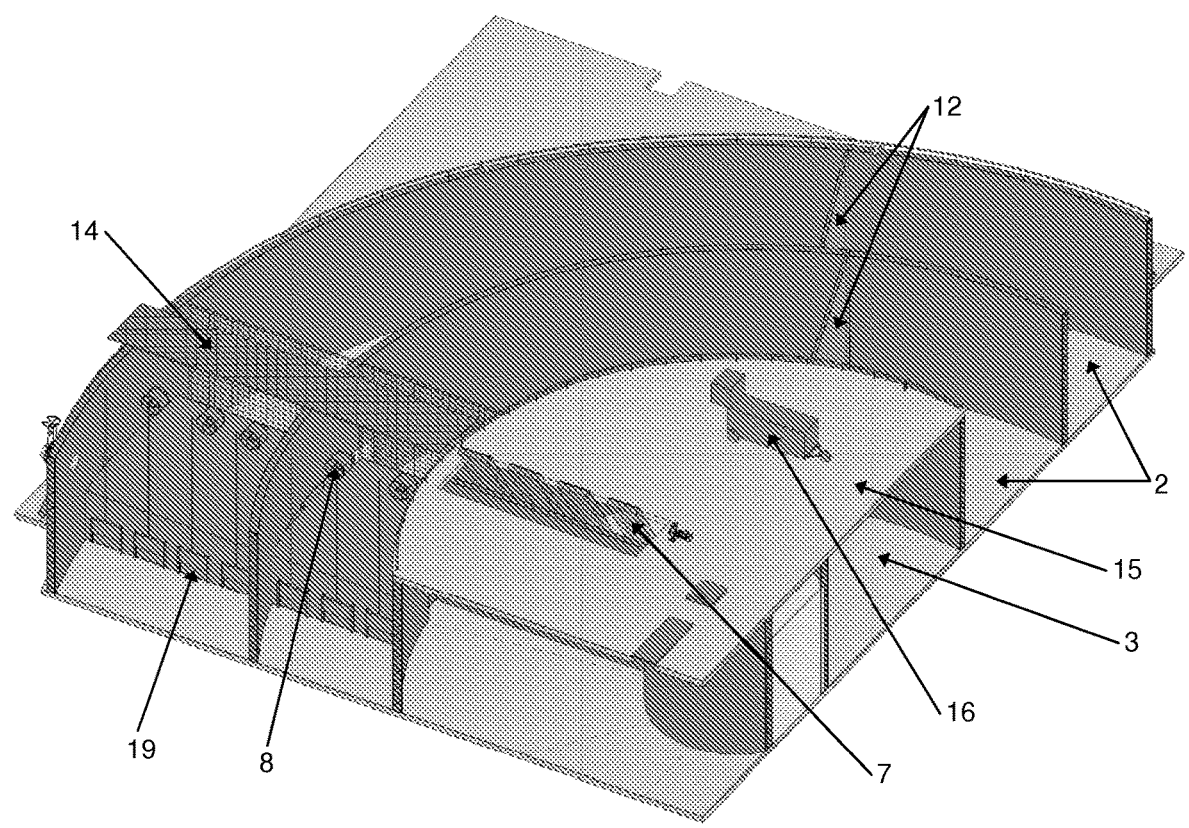
Figure 7:
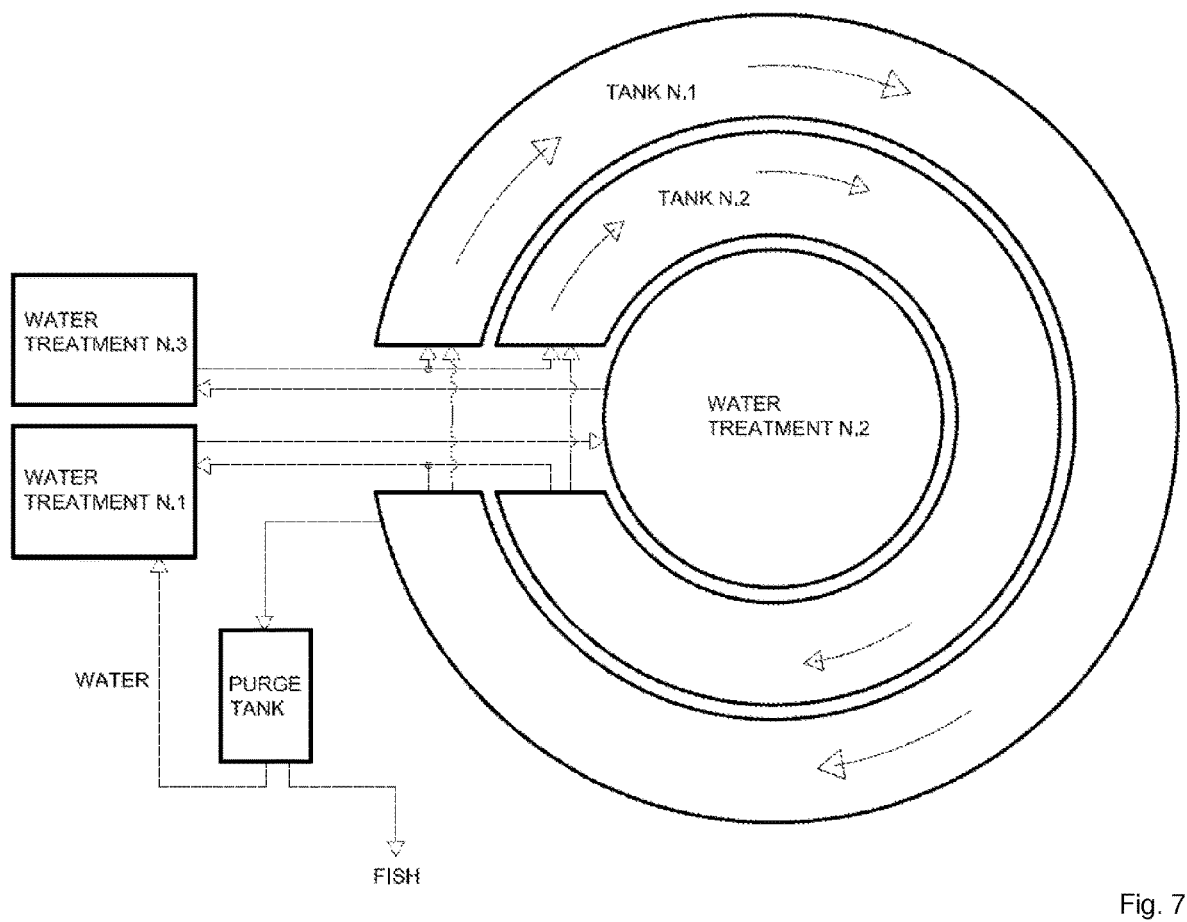
FIG. 7 shows a flow diagram over the fish farming plant. Here the path of the water can be followed from inlet, through one of the surrounding tanks, further to first water treatment (particle filtration), into the central tank (biologic cleaning), out to the last part of the water treatment ($CO_2$-stripping) and last back to the inlet.

With reference to FIGS. 4, 5 and 6 is stated the following:

The outlet 30 is, in contrast to most other RAS-plants, installed in the entire width of the tank. The outlet 30 consists of several openings that each is equipped with a valve 19 or another form of flow control, so that the flow rate of the outlet 30 can be controlled according to requirements across the vessel. Before outlet 30 and after inlet 29 there is installed stop grates 20, which prevents the fishes from coming into the tank section with flow applicators 8 and inlet and outlet 29, 30.

The smaller fish will always be placed in the innermost circular tank, while the largest will be placed in the outermost circular tank, where the harvest-ready fish will be located in the last section before the outlet 30. In this way all fish can be harvested from the same tank section. Before the outlet 30 there is installed a pipe connection to a purge tank 17, where harvest-ready fish can remain until they no longer are characterized by feeding flavor. The fishes can be lead to the purge tank 17 by means of light exposure, where the tank section is more illuminated than the purge tank 17. The pipe connection between the tank section and the purge tank 17 is equipped with a fish counter that keeps track on the number of fish in the purge tank 17. Another way of leading the fish over in the purge tank 17 is by reducing the volume of the tank sections, so that the fish are incited to swim over in the purge tank 17.

The purge tank 17 is equipped with traverse walls 18, so that fish easily can be harvested every day. Each traverse wall 18 is equipped with dampers so the fish easily can be lead from one section of the purge tank 17 to the next. The daily harvesting is especially advantageously for suppliers to recipients that wishes frequently deliveries, adapted to the logistics in the succeeding sale and/or adapted to the capacity in slaughtering/process plants.

The way whereby the water treatment and inlet and outlet 29, 30 are designed, minimizes the need for the piping and totally eliminates the need for piping beneath the bottom level. Totally only four simple pipings are required: inlet and outlet 29, 30 from the fish tanks 2 and inlet and outlet from the biofiltration 6. This results in significantly reduced capital investment and time, as the piping in the plant with this design is minimized from earlier plant designs, and the modest remaining piping can be installed so that the entire plant can be constructed in only two levels. As a starting point the four pipings are planned above the bottom level, but even if they were placed beneath the bottom level of the tanks—which would be possible, the very simple piping concept of the plant would still result in a significantly reduced capital investment and time.

The principle of the construction of a fish farming plant 1 with an annual production of about 70-100 tons can be outlined as follows:

There is constructed a central tank 3 with an inner diameter of 18 meter, and two circular tanks 2 surrounding the central tank 3. The bottom is cast in concrete, and the wall to the tank can be constructed in prefabricated concrete elements, which gives the quickest mounting time, or it can be cast in-situ, provided that concrete is used. The height of the tank walls will be able to be varied dependent on which level of water and the type of fish one will operate with. It will be appropriate to construct the innermost walls in a height of about 0.3 meter higher than the desired level of water. Whereas the height of the outermost wall 11 potentially, with advantage, can be constructed significantly higher, so that it can form part of the climate screen 22.

In the innermost tank 3 of the plant, there will be installed elements for water treatment, e.g. biofiltration 6. In a level above the water level there will be installed a working platform 15 above the central tank 3. This platform will be able to be used for fish sorting 16 and servicing of the fish tanks and can be accessed via crossings 14 which passes over the fish tanks.

Extra water treatment elements, hereunder particle filtration 13 and $CO_2$-stripping 5 can be installed outside the circular shaped construction, eventually in an annex, if the outermost circular shaped wall 11 form part of a part of the climate screen 22. Alternatively can an external climate screen 22 be constructed so it screens both the fish tanks and the external water treatment elements.

If a width of 5 meter of the circular tanks 2 is desired, a wall thickness of 0.2 meter, and an inner diameter of 18 meter of the central tank 3, then the centermost circular wall should be constructed with an inner diameter of 28.4 meter, while the outermost circular wall 11 should be constructed with an inner diameter of 38.8 meter. The width of the fish tanks, the inner diameter of the central tank 3 and the water level can be varied at the construction of the plant taking account of chosen production capacity, fish species and the chosen water treatment technology. The production volume can likewise be additionally increased at the construction of several or wider tanks circular tanks.

The invention claimed is:

1. A recirculating aquaculture system (RAS) fish farming plant comprising:
   a central water treatment tank;
   one or more fish farming tanks at last partially surrounding the central water treatment tank and configured to contain water and fish;
   wherein the RAS fish farming plant includes a water treatment system at least partially contained in the central water treatment tank and configured to receive water from the one or more fish farming tanks, treat the water and return the treated water to the one or more fish farming tanks which gives rise to a water exchange flow rate; and
   one or more flow applicators forming a part of the fish farming plant and configured to:
   (1) increase the flow rate of the water through the one or more fish farming tanks relative to the water exchange flow rate;
   (2) circulate the water through the one or more fish farming tanks such that the flow of the water through the one or more fish farming tanks is substantially horizontal and of a substantial laminar flow;
   a plurality of horizontally moveable permeable walls disposed in each of the fish farming tanks;
   wherein said horizontally moveable permeable walls divide each of the fish farming tanks into a plurality of sectors containing the fish; and
   wherein the horizontally moveable permeable walls in each of the fish farming tanks are moveable horizontally with respect to each other through the fish farming tank to vary the area of the respective sectors in each fish farming tank which in turn varies the density of the fish contained in the respective sectors.

2. The RAS fish farming plant of claim 1 wherein the one or more fish farming tanks includes a plurality of horizontally moveable permeable walls that divide the one or more fish farming tanks into a plurality of sections; and wherein each permeable wall is configured to move horizontally through the one or more fish farming tanks and adjust the volume of water situated between selected permeable walls.

3. The RAS fish farming plant of claim 2 wherein each horizontal moveable permeable wall includes at least two wheels that engage and ride on rails disposed on walls that form the one or more fish farming tanks.

4. The RAS fish farming plant of claim 2 wherein each permeable wall includes a plurality of foldable sections that enable the width of the permeable wall to be adjusted.

* * * * *